(12) United States Patent
Landacre et al.

(10) Patent No.: US 12,467,542 B2
(45) Date of Patent: Nov. 11, 2025

(54) VALVE HAVING A QUAD RING SEAL

(71) Applicant: MAC Valves, Inc., Wixom, MI (US)

(72) Inventors: Brett Landacre, Bloomfield Hills, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 107 days.

(21) Appl. No.: 18/440,202

(22) Filed: Feb. 13, 2024

(65) Prior Publication Data

US 2025/0257804 A1  Aug. 14, 2025

(51) Int. Cl.
*F16K 1/46* (2006.01)
*F16K 27/02* (2006.01)

(52) U.S. Cl.
CPC .............. *F16K 1/46* (2013.01); *F16K 27/029* (2013.01)

(58) Field of Classification Search
CPC .................................. F16K 1/46; F16K 27/029
See application file for complete search history.

(56) References Cited

U.S. PATENT DOCUMENTS

| | | | |
|---|---|---|---|
| 3,202,182 A | 8/1965 | Haviland | |
| 4,915,134 A | 4/1990 | Toliusis et al. | |
| 5,048,790 A * | 9/1991 | Wells | F16K 31/408 |
| | | | 251/44 |
| 5,906,352 A * | 5/1999 | Post | F16K 27/029 |
| | | | 251/44 |
| 6,722,628 B1 | 4/2004 | Seil | |
| 7,234,704 B2 | 6/2007 | Lehr et al. | |
| 8,210,207 B2 | 7/2012 | Toliusis | |
| 10,473,229 B2 * | 11/2019 | Landacre | F16K 39/022 |
| 10,774,943 B2 | 9/2020 | Landacre et al. | |
| 11,248,715 B1 | 2/2022 | Janssen et al. | |
| 11,549,590 B2 | 1/2023 | Joo et al. | |
| 2014/0175312 A1 | 6/2014 | Jamison et al. | |
| 2015/0233488 A1 | 8/2015 | Holmes et al. | |
| 2022/0196178 A1 | 6/2022 | Janssen et al. | |

FOREIGN PATENT DOCUMENTS

DE   102004053083 A1   9/2005

OTHER PUBLICATIONS

International Search Report and Written Opinion of the ISA issued in PCT/US2025/015342, mailed Jul. 10, 2025; ISA/KR.

* cited by examiner

*Primary Examiner* — Eric Keasel

(74) *Attorney, Agent, or Firm* — Harness, Dickey & Pierce, P.L.C.

(57) ABSTRACT

A valve apparatus including a hollow valve retainer that includes a poppet slidingly positioned therein. The poppet includes a radially inwardly extending groove that is configured for receipt of a quad-ring sealing member that improves the sealing characteristics of the valve apparatus, as well as reduces friction between the poppet and valve retainer to increase the useful life of the valve apparatus.

8 Claims, 13 Drawing Sheets

VALVE HAVING A QUAD RING SEAL

FIELD

The present disclosure relates to a valve having a quad ring seal.

BACKGROUND

This section provides background information related to the present disclosure which is not necessarily prior art.

Solenoid operated valves are frequently used in a variety of different applications, such as in sorters, packaging machines, food processors, and the like. These valves are used to control the flow of fluid and may be operated for millions of cycles. Inasmuch as these valves may be operated for millions of cycles, the seals that are used between a member of the valve that moves relative to another member of the valve may wear out to an extent that sealing integrity is compromised. Accordingly, it is desirable to provide a solenoid operated valve that includes seals that are not as susceptible to wear over the large number of cycles that the valve is operated.

SUMMARY

This section provides a general summary of the disclosure, and is not a comprehensive disclosure of its full scope or all of its features.

According to a first aspect of the present disclosure, there is provided a valve apparatus comprising a manifold having a bore, an inlet communicating with the bore, and an outlet communicating with and axially aligned with the bore; a valve cartridge at least partially received within the bore and including a valve assembly having a valve member that enables communication between the inlet and the outlet, and an actuator assembly for actuating the valve member; the valve assembly including a hollow valve retainer having a first end that is configured to mate with the actuator assembly and an opposite second end received within the bore and defining an outlet port that communicates with the outlet of the manifold, the hollow valve retainer including a first plate-shaped member and a second plate-shaped member connected by a pair of axially extending arms that separate the first and second plate-shaped members by a gap that serves as an inlet port of the valve retainer in communication with the inlet of the manifold, the first plate-shaped member including a first axially-extending through-hole that defines the outlet port and the second plate-shaped member including a second axially-extending through-hole that is configured for receipt of a poppet having the valve member therein, the first plate-shaped member includes a first face that faces the gap and an opposite second face that faces the outlet of the manifold, the first axially-extending through-hole extends between the first face and the second face, and the first axially-extending through hole includes a first chamfered surface that defines a valve seat at the first face that is configured to be contacted by the valve member when the valve apparatus is in a closed position and spaced apart from the valve member when the valve apparatus is in an open position; the poppet includes a proximate end positioned within the actuator assembly and a distal end that includes the valve member, the distal end having a radially inwardly extending groove between the valve member and the proximate end that is configured for receipt of an annular quad-ring sealing member that seals an interface between the poppet and the second axially-extending through hole of the valve retainer as the poppet and valve member are moved during operation of the valve apparatus by the actuator assembly; and the valve member at the distal end of the poppet includes a second chamfered surface that corresponds to the first chamfered surface that defines the valve seat.

According to the first aspect, the valve apparatus further comprises a biasing member that biases the poppet and valve member to the closed position, wherein the biasing member is in contact with an annular arm that extends radially outward from the poppet.

According to the first aspect, the radially inwardly extending groove having the annular quad-ring sealing member is positioned between the valve member and the annular arm that extends radially outward from the poppet.

According to the first aspect, the first axially-extending hole includes the first chamfered surface and a cylindrical surface connected to the first chamfered surface.

According to the first aspect, the first chamfered surface includes a first end connected to the first face of the first plate-shaped member and a second end that defines an apex, and a radially outwardly extending surface connects the apex to the cylindrical surface, and wherein the radially outwardly extending surface that connects the apex to the cylindrical surface defines a seat configured for receipt of an annular seal member that is configured to be contacted by valve member when the valve apparatus is in the closed position.

According to the first aspect, the second plate-shaped member of the hollow valve retainer includes a first face that faces the gap and an opposite second face that faces the actuator assembly; and a hollow cylindrical protrusion extends axially outward from the second face and includes a terminal end that defines the first end of the hollow valve retainer that is configured to mate with the actuator assembly, an outer surface of the terminal end being threaded to threadingly mate with a threaded surface of a housing of the actuator assembly.

According to the first aspect, the housing of the actuator assembly is configured for receipt of the proximate end of the poppet.

According to the first aspect, the actuator assembly includes the housing, and a solenoid configured to magnetize a pole piece positioned in the housing to magnetically attract the proximate end of the poppet to move the valve member away from the valve seat and open the valve apparatus.

According to a second aspect of the present disclosure, there is provided a valve apparatus comprising a manifold having a bore, an inlet communicating with the bore, and an outlet with the bore; a valve cartridge at least partially received within the bore and including a valve assembly having a valve member that enables communication between the inlet and the outlet, and an actuator assembly for actuating the valve member; the valve assembly including a hollow valve retainer having a first end that is configured to mate with the actuator assembly and an opposite second end received within the bore, the hollow valve retainer having an inlet port that communicates with the inlet of the manifold and defines a first valve seat configured to be contacted by the valve member when the valve apparatus is in a closed position, and an outlet port that communicates with the outlet of the manifold; and the valve assembly including a poppet positioned within and movable relative to the hollow valve retainer, the poppet including a proximate end positioned within the actuator assembly and a distal end that includes a first piston, a second piston, and the valve member between the first piston and the second piston, the valve assembly including an adjustable valve seat positioned within and attached to the hollow valve retainer, the adjustable valve seat defining a second valve seat configured to be contacted by the valve member when the valve apparatus is in an open position; wherein each of the first piston and the second piston have a radially inwardly extending groove that is configured for receipt of an annular quad-ring sealing member that seals an interface between the first piston and the hollow valve retainer and an interface between the second piston and the adjustable valve seat.

According to the second aspect, the valve apparatus further comprises a biasing member that biases the poppet and valve member to the closed position, the biasing member being in contact with the second piston of the poppet.

According to the second aspect, the manifold includes a second outlet in communication with the bore, and the adjustable valve seat includes an outlet port in communication with the second outlet.

According to the second aspect, the actuator assembly includes a housing attached to the valve retainer and a solenoid configured to magnetize a pole piece positioned in the housing to magnetically attract the proximate end of the poppet to move the valve member away from the first valve seat and open the valve apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
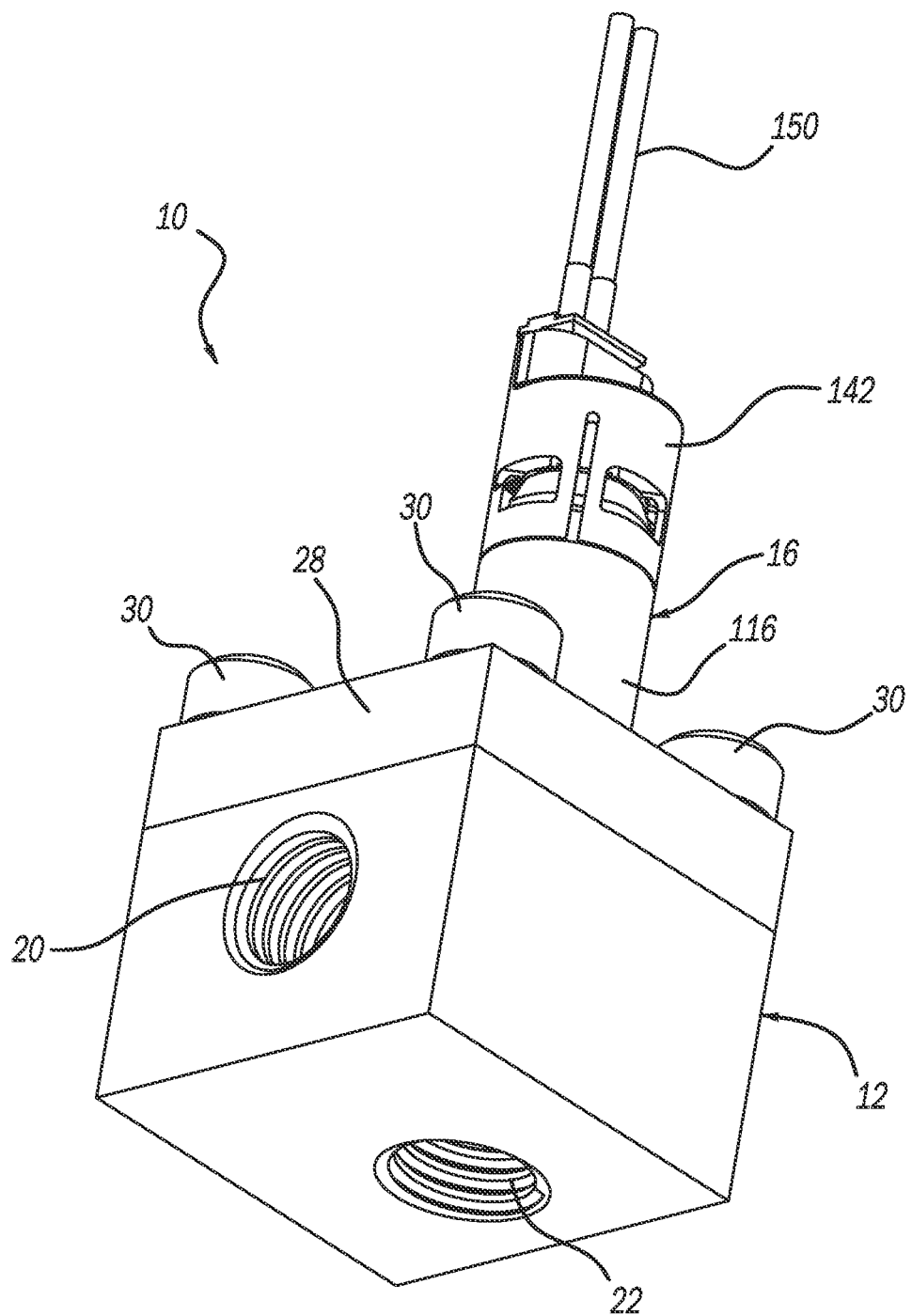
FIG. 1 is a perspective view of a valve apparatus according to a principle of the present disclosure.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1 to 5 illustrate an example valve apparatus 10 according to a principle of the present disclosure. Valve apparatus 10 includes a manifold 12, a valve assembly 14 (FIGS. 2 and 3) at least partly positioned in the manifold 12, and an actuator assembly 16 connected to the valve assembly 14 for actuating a valve member 18 (FIG. 3) of valve assembly 14 between an open and a closed position for permitting a fluid to pass through the manifold 12 from an inlet 20 to an outlet 22. Valve assembly 14 and actuator assembly 16 may collectively define a cartridge 24 that is configured to be attached to and detached from manifold 12, as will be described in more detail later.

Figure 4:
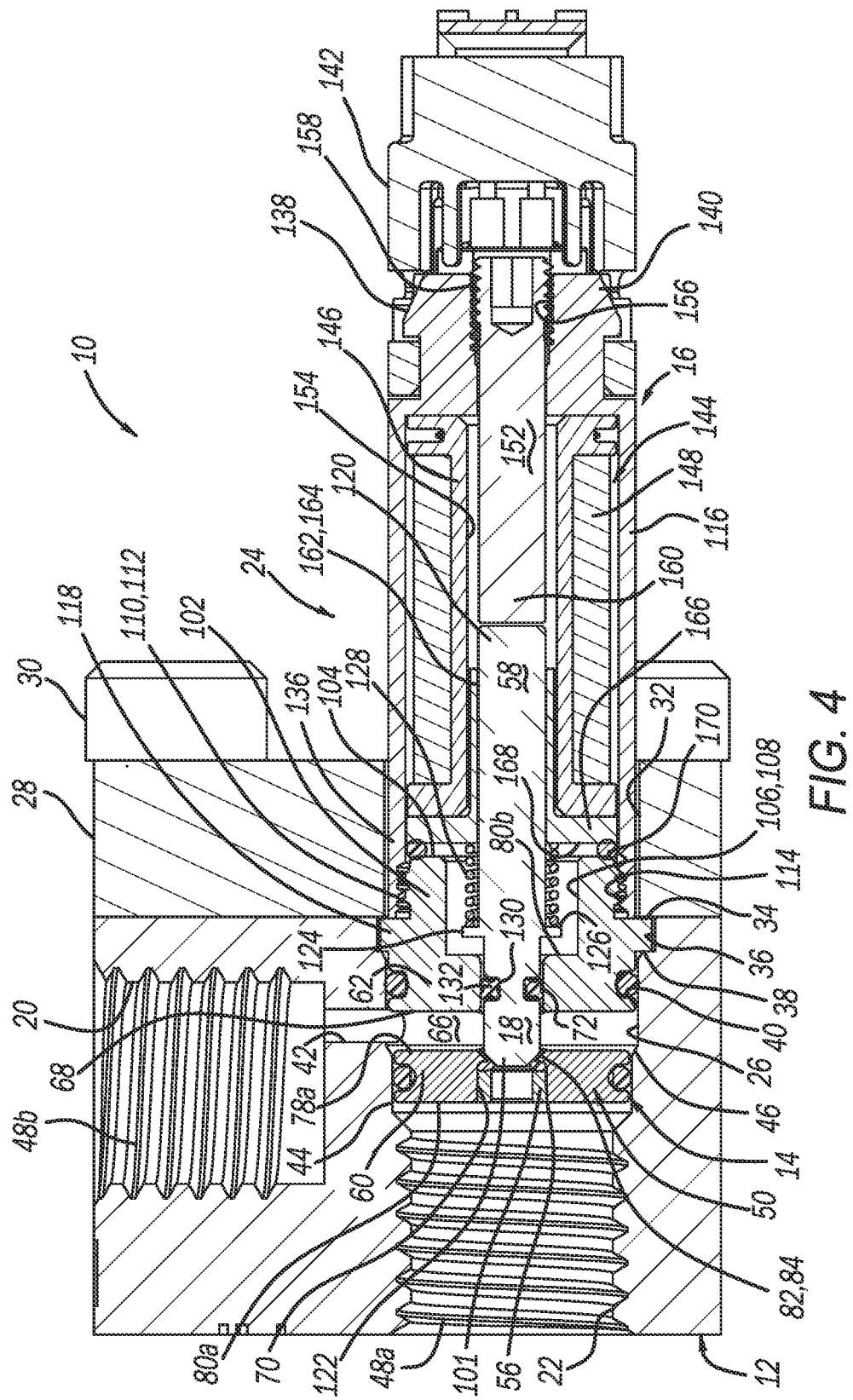
FIG. 4 is a cross-sectional view of the valve apparatus illustrated in FIG. 1.

In the illustrated embodiment, manifold 12 is a block-shaped member having, as noted above, inlet 20 and outlet 22. It should be understood, however, that outlet 22 may serve as the inlet and the inlet 20 may serve as the outlet, if desired. In any event, manifold 12 may be formed of a rigid material such as a metal or polymeric material. Manifold 12 also defines a bore 26 that, as best shown in FIG. 4, is arranged coaxially with outlet 22. Bore 26 is configured for receipt of at least a portion of cartridge 24 and particularly configured for receipt of valve assembly 14. While not required, manifold may include a lid 28 that can be secured to manifold 12 using a plurality of fasteners 30. Lid 28 may be used to secure valve assembly 14 within manifold 12 and, therefore, may include a through-hole 32 configured to permit at least a portion of cartridge 24 to pass therethrough. Similar to manifold 12, lid 28 may be formed of a rigid material such as a metal material or a polymeric material.

As best shown in FIG. 4, bore 26 defines an opening 34 formed in manifold 12. A first cylindrical surface 36 of bore 26 extends axially inward from opening 34 before terminating at a first radially inwardly extending shoulder 38. A second cylindrical surface 40 extends axially inward from radially inwardly extending shoulder 38. Because first shoulder 38 extends between first cylindrical surface 36 and second cylindrical surface 40, a diameter of first cylindrical surface 36 is greater than a diameter of second cylindrical surface 40. A radially outwardly extending cylindrical passage 42 that provides communication between inlet 20 and bore 26 is formed at second cylindrical surface 40. A third cylindrical surface 44 is positioned axially inward from second cylindrical surface 40, and is separated from second cylindrical surface 40 by a second radially inwardly extending shoulder 46. Because second shoulder 46 extends between second cylindrical surface 40 and third cylindrical surface 44, a diameter of second cylindrical surface 40 is greater than a diameter of third cylindrical surface 44. Third cylindrical surface 44 is connected to outlet 22, which may include a threaded surface 48a. Similar to outlet 22, inlet 20 may also include a threaded surface 48b.

Valve assembly 14 is configured to mate with bore 26. Valve assembly 14 includes a hollow valve retainer 50 having a first end 52 that is configured to mate with actuator assembly 16 and an opposite second end 54 defining an outlet port 56 (FIG. 3) that communicates with outlet 22 of manifold 12 when the valve assembly 14 is in the open position. Valve retainer 50 may be formed of a rigid material such as a metal material or a polymer material. Valve assembly 14 also includes a poppet 58 positioned within and movable relative to valve retainer 50.

Figure 2:
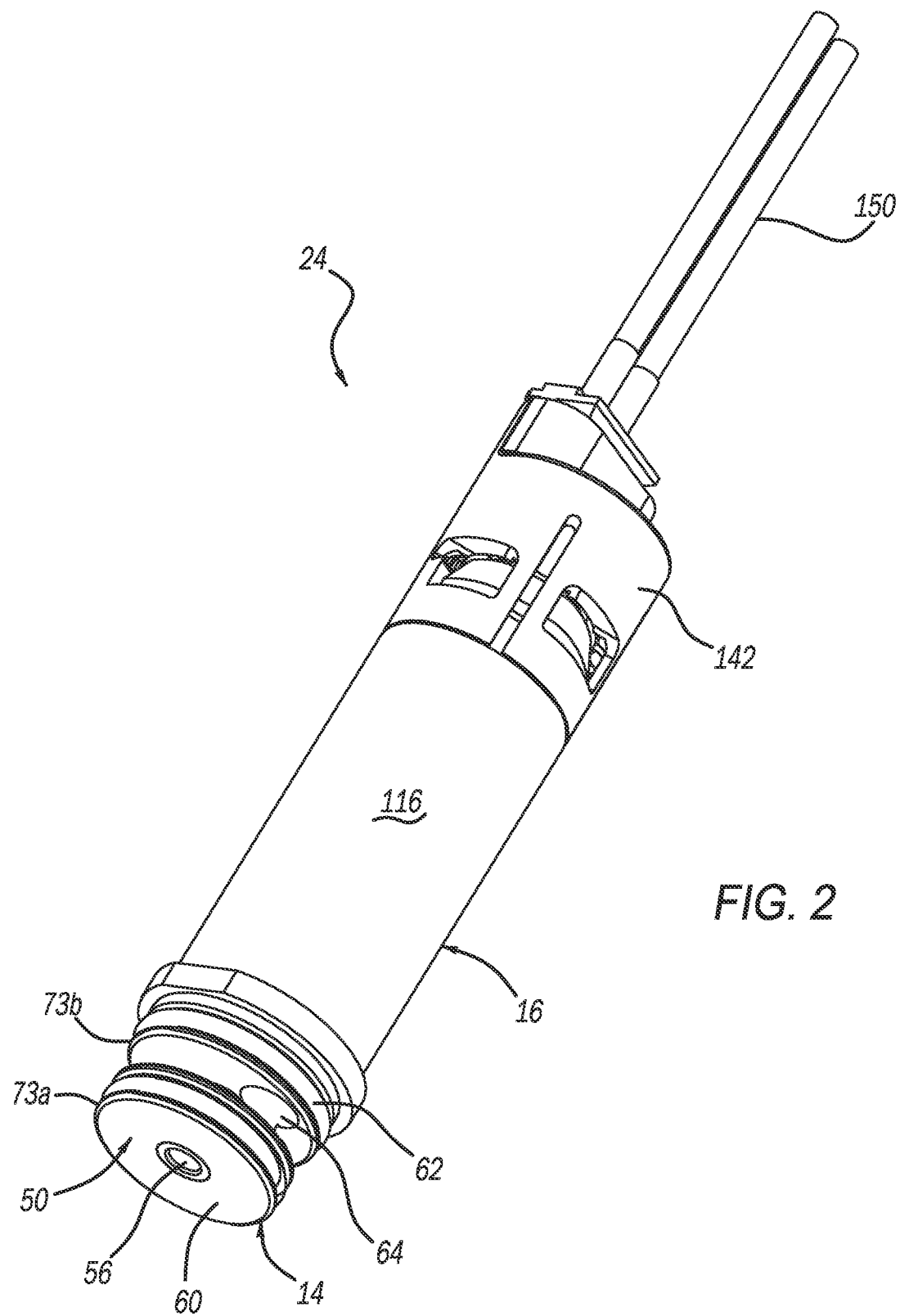
FIG. 2 is a perspective view of a valve cartridge that is part of the valve apparatus illustrated in FIG. 1.
Figure 3:
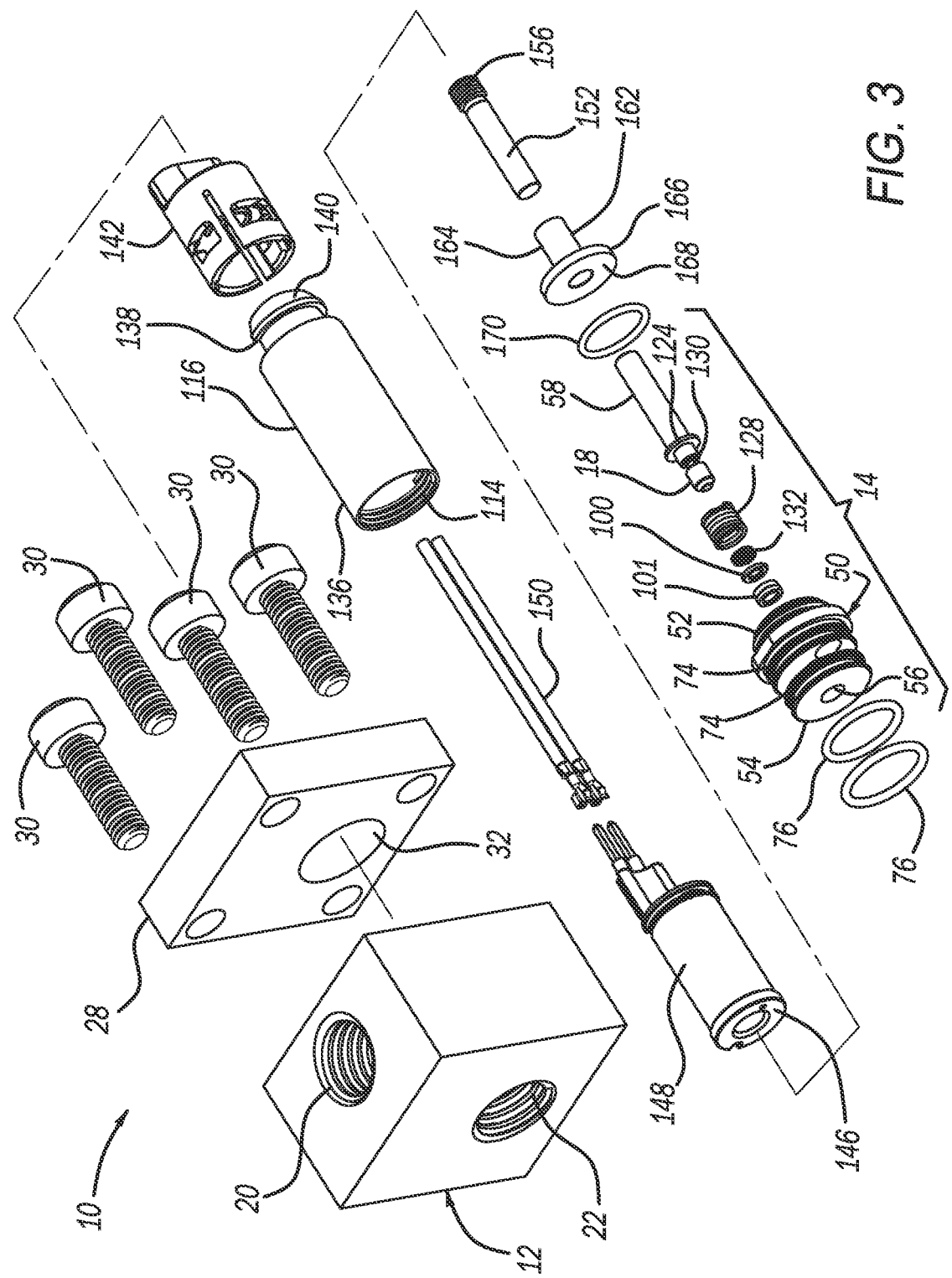
FIG. 3 is an exploded perspective view of the valve apparatus illustrated in FIG. 1.

Valve retainer 50 includes a first plate-shaped member 60 and a second plate-shaped member 62 connected by a pair of axially extending arms 64 (FIG. 2). Arms 64 separate first and second plate-shaped members 60 and 62 by a gap 66 that serves as an inlet port 68 of valve retainer 50 in communication with inlet 20 of manifold 12. First plate-shaped member 60 includes a first axially-extending through-hole 70 that defines outlet port 56. Second plate-shaped member 62 includes a second axially-extending through-hole 72 that is configured for receipt of poppet 58 therein. Each of first plate-shaped member 60 and second plate-shaped member 62 also include an outer cylindrical surface 73a and 73b (FIG. 2) that respectively include a radially inwardly extending recess 74 (FIG. 3) configured for receipt of an annular sealing member 76 (FIG. 3), which may be an O-ring. Outer cylindrical surface 73a of first plate-shaped member 60 is configured to be located adjacent third cylindrical surface 44 of bore 26 and outer cylindrical surface 73b of second plate-shaped member 62 is configured to be located adjacent second cylindrical surface 40 of bore 26 and, therefore, a diameter of first plate-shaped member 60 may be less than that of second plate-shaped member 62. Further, by locating outer cylindrical surfaces 73a and 73b relative to third cylindrical surface 44 and second cylindrical surface 40, respectively, the inlet port 68 is aligned with radially outwardly extending cylindrical passage 42 that provides communication between inlet 20 and bore 26 (FIG. 4).

First plate-shaped member 60 includes a first face 78a that faces the gap 66 and an opposite second face 80a that faces outlet 22 of manifold 12. First axially-extending through-hole 70 extends between first face 78a and opposite second face 80a, and includes a first chamfered surface 82 that defines a valve seat 84 at first face 78a configured to be contacted by valve member 18 when valve apparatus 10 is in the closed position (FIGS. 3 and 4), and be spaced apart from valve member 18 when valve apparatus is in the open position (not shown).

Figure 5:
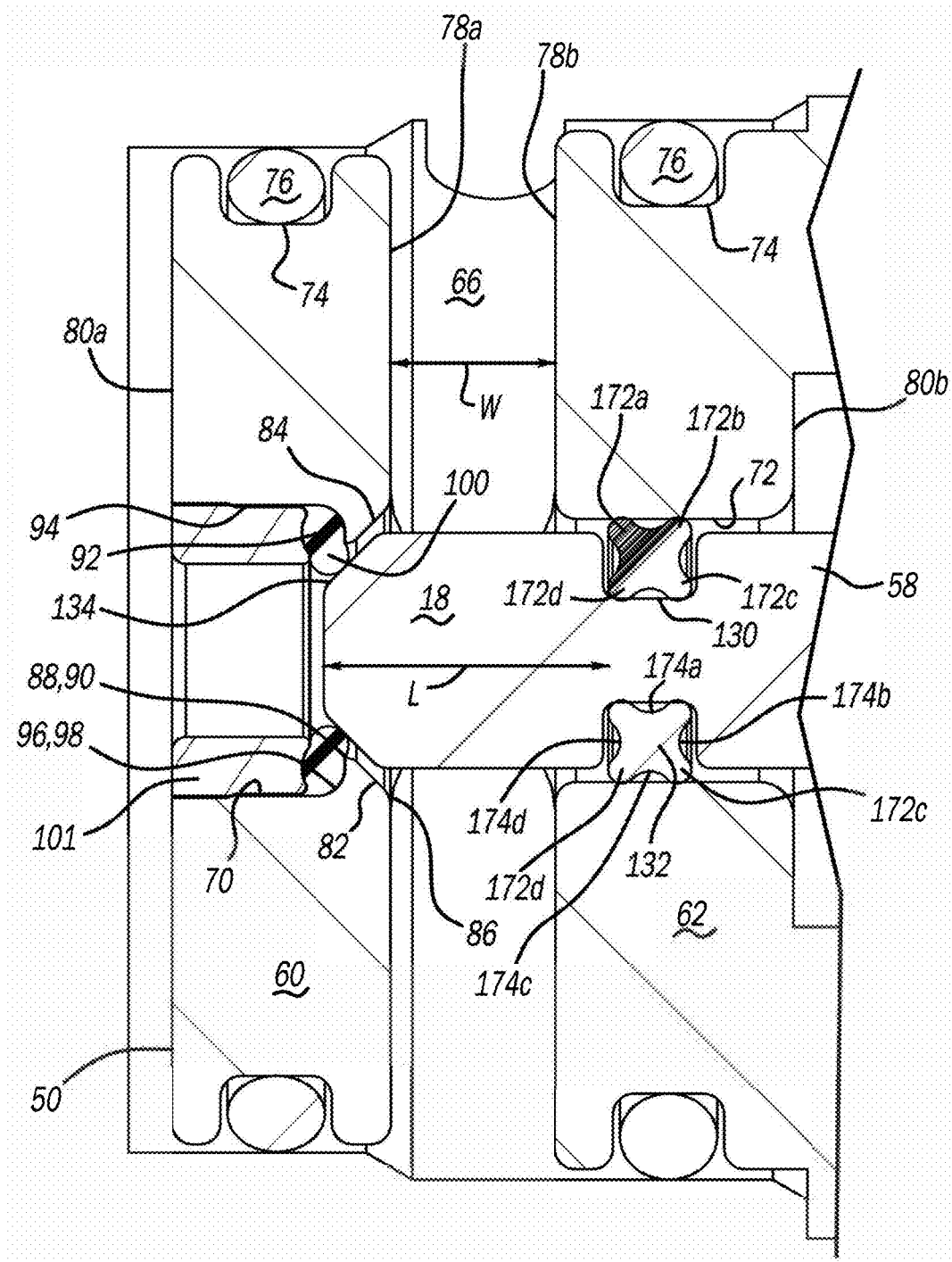
FIG. 5 is an enlarged cross-sectional view of a portion of the valve apparatus illustrated in FIG. 4.
Figure 6:
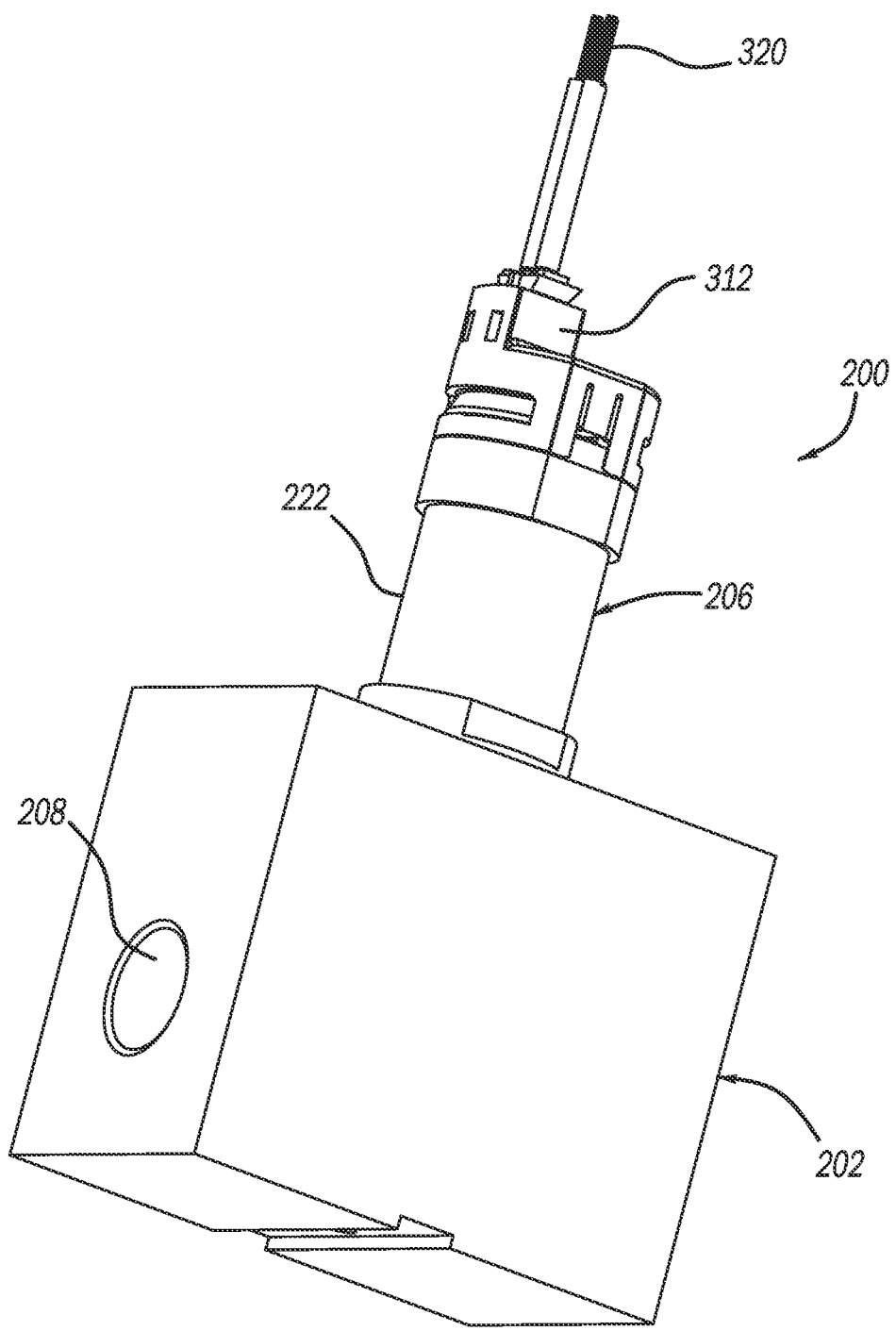
FIG. 6 is a perspective view of another valve apparatus according to a principle of the present disclosure.
Figure 7:
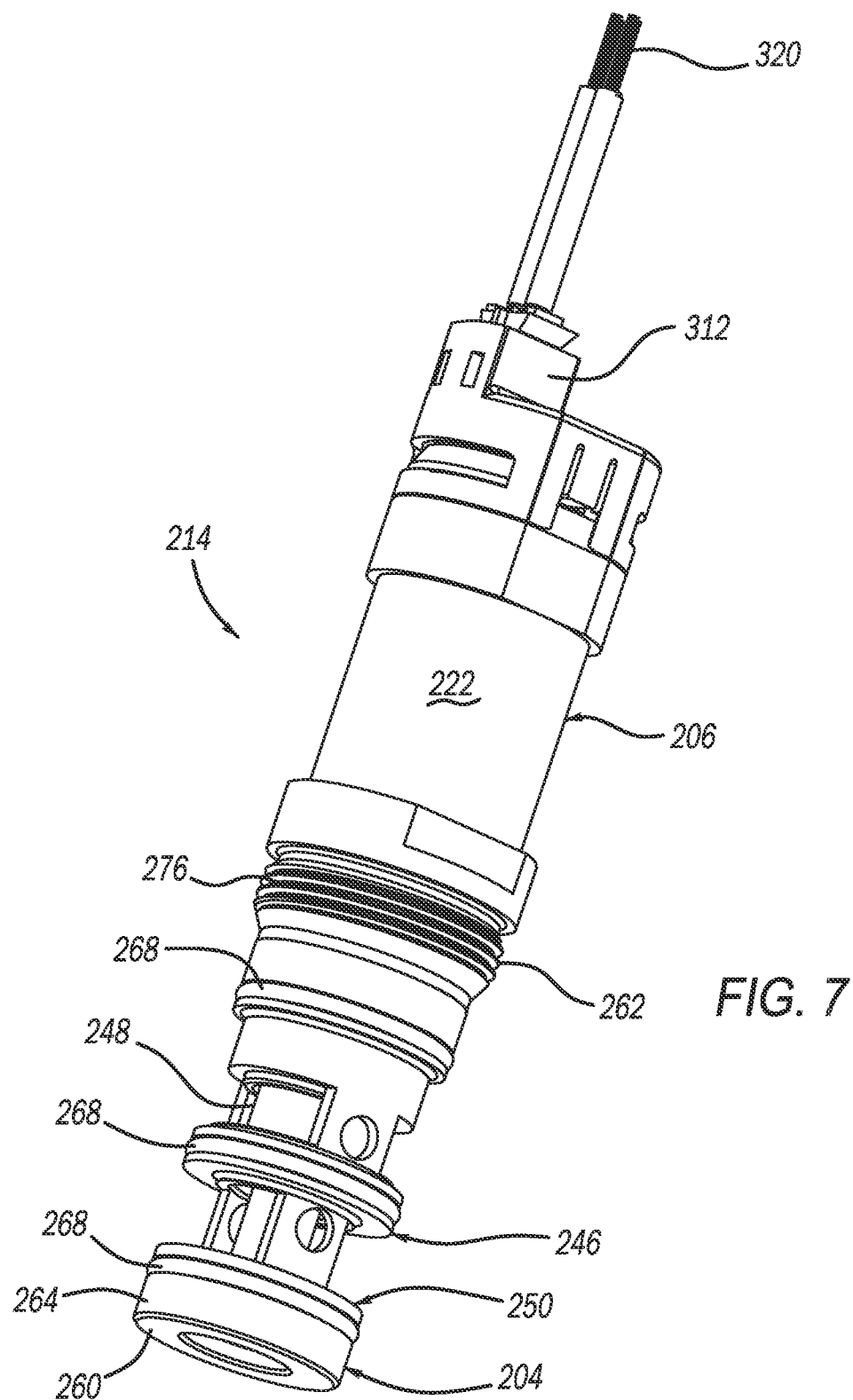
FIG. 7 is a perspective view of a valve cartridge that is part of the valve apparatus illustrated in FIG. 6.
Figure 8:
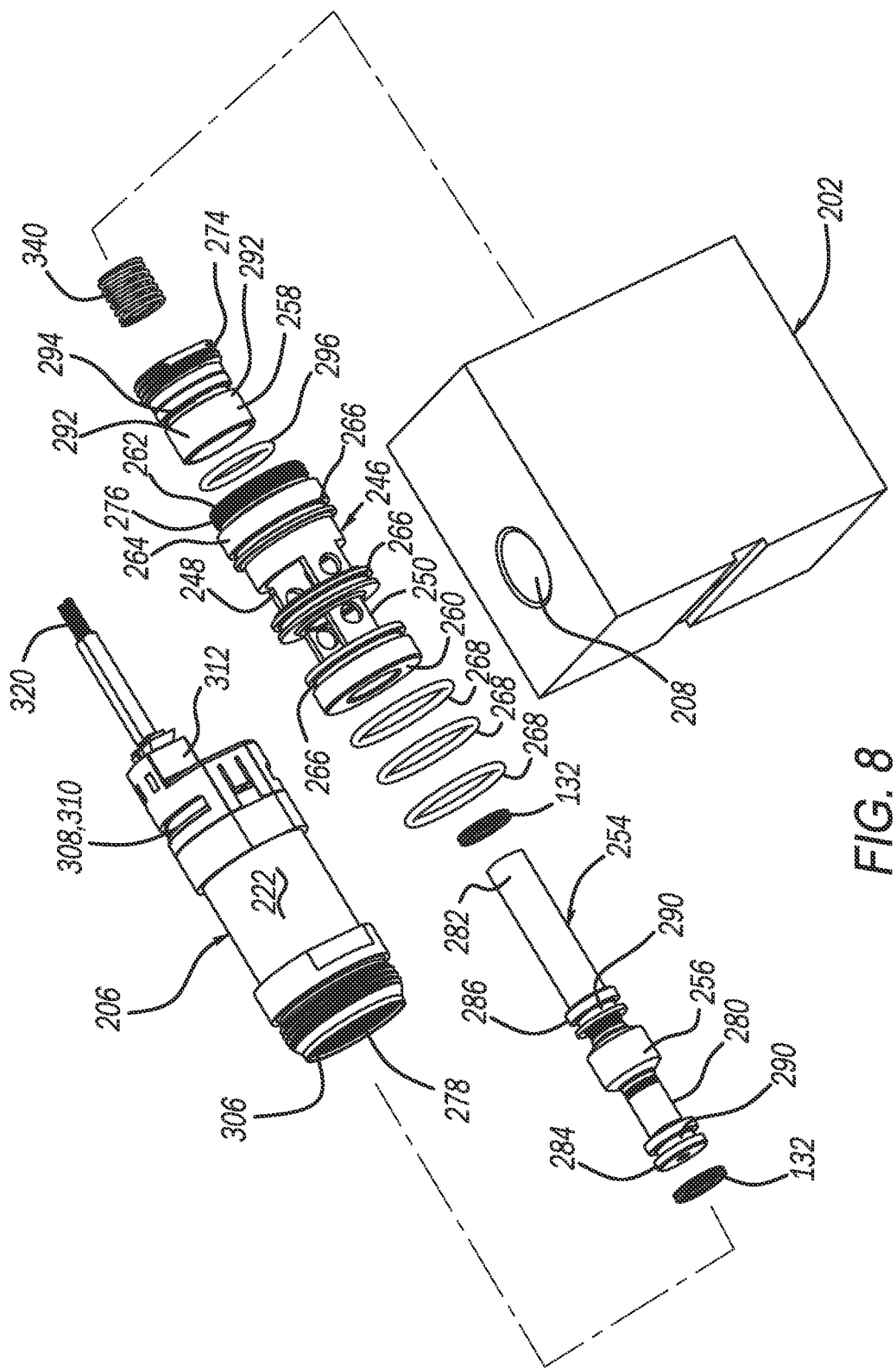
FIG. 8 is an exploded perspective view of the valve apparatus illustrated in FIG. 6.

As best shown in FIG. 5, first chamfered surface 82 includes a first end 86 connected to first face 78a and a second end 88 that defines an apex 90. As first axially-extending through-hole 70 extends from apex 90 to outlet port 56, the surface 92 extends radially outwardly from apex 90 before transitioning to a cylindrical surface 94. The radially outwardly extending surface 96 that connects apex 90 to cylindrical surface 94 defines a seat 98 configured for receipt of an annular seal member 100 that is held in place by a hollow orifice retainer 101 that in combination with first axially extending through-hole 70 defines outlet port 56. Annular seal member 100 may be contacted by valve member 18 when valve apparatus 10 is in the closed position.

Second plate-shaped member 62 includes a first face 78b and an opposite second face 80b that faces actuator assembly 16. A hollow cylindrical protrusion 102 (FIG. 4) extends axially outward from second face 80b, a terminal end 104 of which defines opposite first end 52 of valve retainer 50. As best shown in FIG. 4, an interior surface 106 of protrusion 102 includes second face 80b that is connected to second axially-extending through-hole 72 and to an axially-extending cylindrical surface 108. A diameter of axially-extending cylindrical surface 108 is greater than that of second axially-extending through-hole 72 to account for various features poppet 58, which will be described in more detail later. An outer surface 110 of protrusion 102 includes a threading 112 that is configured to mate with a threading 114 of a housing 116 of actuator assembly 16 and includes a radially outwardly extending shoulder 118 that is configured to be located adjacent to first cylindrical surface 36 and abut against radially inwardly extending shoulder 38 of bore 26.

Poppet 58 is positioned between valve assembly 14 and actuator assembly 16. Poppet 58 may be formed of a magnetically-attractable material (e.g., steel, iron, etc.), includes a proximate end 120 positioned within actuator assembly 16 and a distal end 122 that defines valve member 18, and which is unitary with proximate end 120. A radially outwardly extending arm 124 that defines a first seat 126 for a biasing member 128 or spring that biases poppet 58 and valve member 18 in a direction toward valve seat 84 of valve retainer 50 is located between proximate end 120 and distal end 122.

In addition to valve member 18, distal end 122 includes a radially inwardly extending groove 130 that is configured for receipt of an annular quad-ring seal member 132 that seals the interface between poppet 58 and second axially-extending through hole 72 of valve retainer 50. The use of annular quad-ring seal member 132 provides increased sealing capability between valve assembly 14 and actuator assembly 16, as well as an increased life-span in comparison to a conventional seal member such as an O-ring. Quad-ring seal member 132 may be formed of a material such as FKM, but may be formed of any conventional seal material known to one skilled in the art (e.g., rubber, EPDM, fluoroelastomer, and the like). A more detailed description of quad-ring seal member 132 will be provided later.

Valve member 18 at distal end 122 of poppet 58 includes a second chamfered surface 134 (FIG. 5) that corresponds to first chamfered surface 82 that defines valve seat 84. As best shown in FIG. 5, second chamfered surface 134 is configured to contact annular seal member 100 to close valve apparatus 10, but may be configured to contact valve seat 84 simultaneously. Put another way, valve seat 84 may serve as a hard stop for second chamfered surface 134. An axial length L of valve member 18 is greater than a width W of gap 66.

Again referring to FIG. 4 and as noted above, actuator assembly 16 is connected to valve assembly 14 by mating threading 114 of housing 116 with threading 112 of valve retainer 50. Housing 116 is a generally hollow cylindrical structure that includes one end 136 having threading 114 and an opposite end 138 that defines a coupling 140 configured to be mated with an electrical connector 142 for providing a voltage or current to a solenoid 144 provided in housing 116. Solenoid 144 includes a hollow yoke 146 that supports a solenoid coil 148 having opposing ends (not shown) that are electrically connected to a pair of leads 150 of electrical connector 142.

Proximate end 120 of poppet 58 may function as an armature that is magnetically attracted to a pole piece 152 provided within an elongated aperture 154 of yoke 146. Pole piece 152 is formed of a material that can be magnetized upon application of the voltage or current to solenoid coil 148. Put another way, upon application of the voltage or current to solenoid coil 148, pole piece 152 will be magnetized to attract poppet 58 thereto, which will pull valve member 18 away from valve seat 84 to open valve apparatus 10 and permit fluid to flow from inlet 20 through valve assembly 14 to outlet 22. Pole piece 152 includes a threaded end 156 that mates with an interior threaded surface 158 of coupling 140 such that pole piece 152 is fixed during use of valve apparatus 10. An opposing end 160 of pole piece 152 is spaced apart from proximate end 120 of poppet 58 such that proximate end 120 will contact opposing end 160 when pole piece 152 is magnetized and pulls proximate end 120 thereto to open valve apparatus 10.

A hollow bushing 162 may be positioned between yoke 146 and poppet 58. Bushing includes a hollow cylindrical sleeve 164 that extends along a portion of a length of poppet 58 and a radially outwardly extending flange 166 that serves as a second seat 168 for biasing member 128. In addition, an annular sealing member 170 may be positioned between flange 166 and terminal end 104 of protrusion 102 of valve retainer 50 to provide a seal between valve assembly 14 and actuator assembly 16.

Again referring to FIG. 5, quad-ring sealing member 132 is illustrated in more detail. Quad-ring sealing member 132 has four lobes 172a, 172b, 172c, and 172d that are separated by recesses 174a, 174b, 174c, and 174d such that quad-ring sealing member 132 has a cross-sectional shape that resembles an "X." As noted above, quad-ring sealing member 132 provides increased sealing capability between valve assembly 14 and actuator assembly 16, as well as an increased life-span in comparison to a conventional seal member such as an O-ring. In this regard, lobes 172a and 172b provide a pair of sealing surfaces or seal lips that engage with second axially extending through-hole 72 and lobes 172c and 172d provide a pair of sealing surfaces or seal lips that engage with groove 130 formed in poppet 58. In addition, because the amount of contact between the lobes 172a-172d and the second axially extending through-hole 72 and groove 130 is less than what would occur if seal member 132 were replaced by, for example, an O-ring or D-ring, the amount of friction generated between sealing member 132 and these surfaces can be reduced, which can permit poppet 58 to move towards and away from valve seat 84 by applying a reduced voltage or current to solenoid 144.

Now referring to FIGS. 6 to 9, a second embodiment of the present disclosure will be described. The valve apparatus 200 illustrated in FIGS. 6 to 9 is similar to the valve apparatus 10 described above, but includes a different manifold 202, a different valve assembly 204 (FIG. 7), and a slightly different actuator assembly 206.

Figure 9:
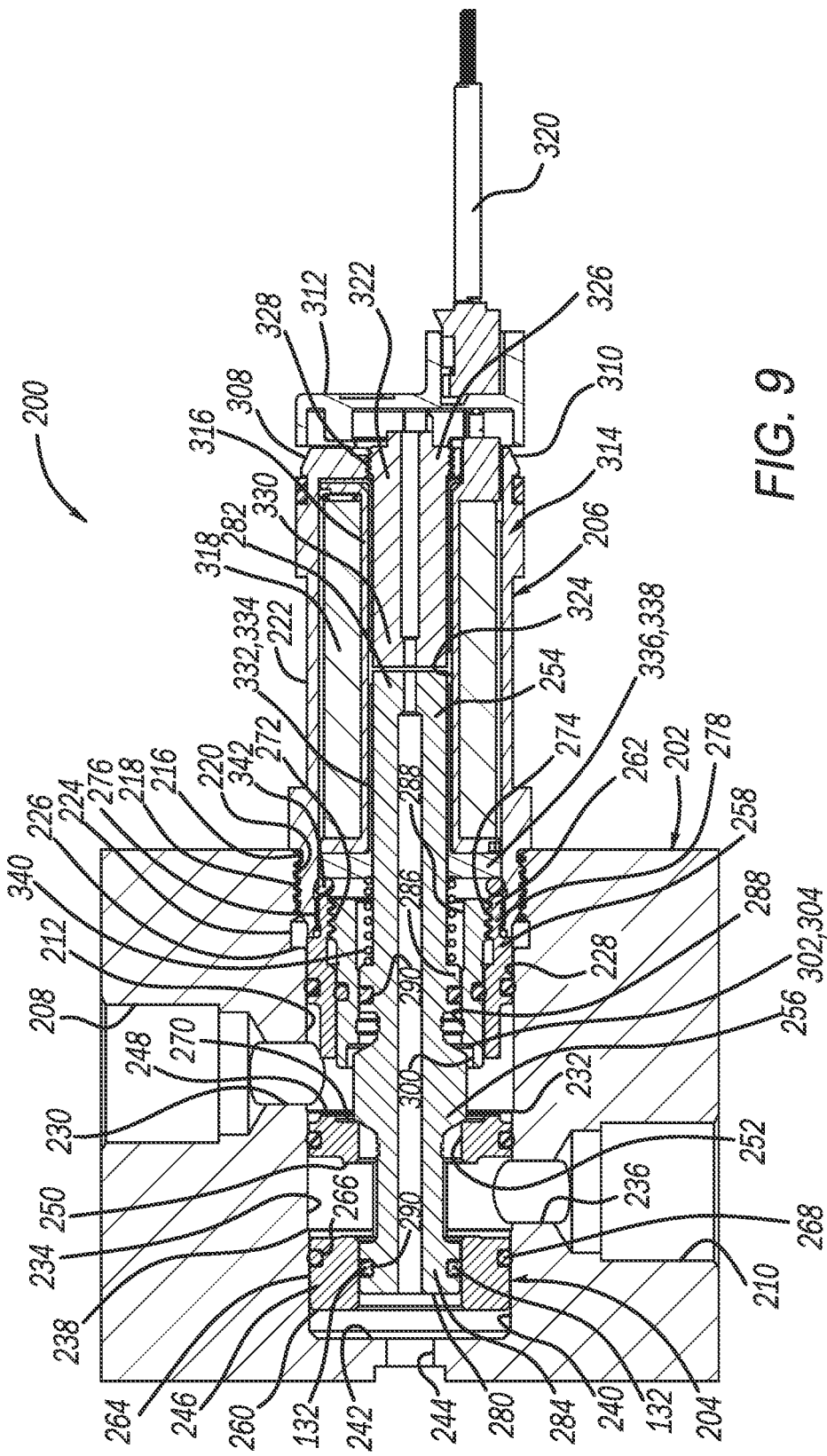
FIG. 9 is a cross-sectional view of the valve apparatus illustrated in FIG. 6.
Figure 10:
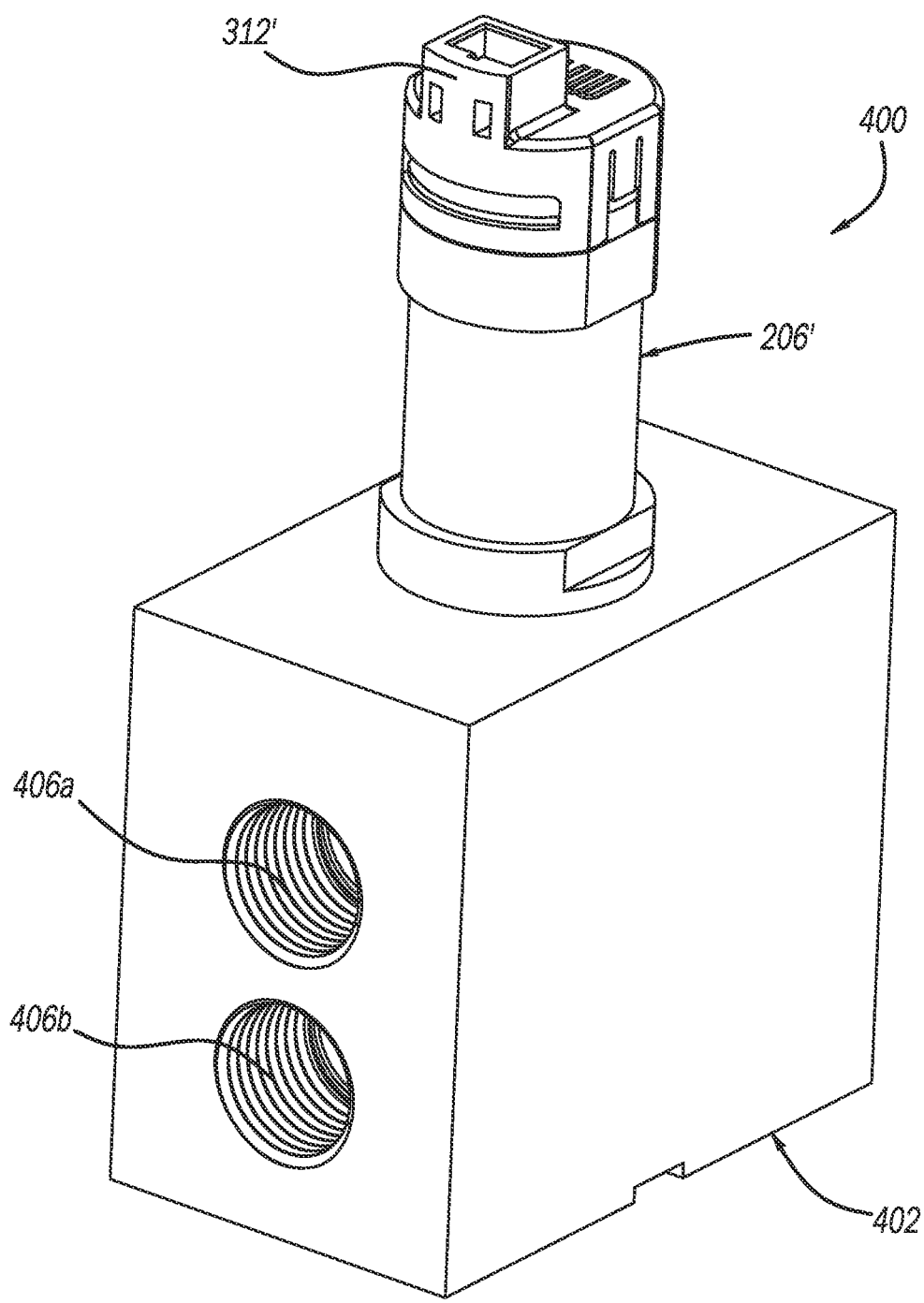
FIG. 10 is a perspective view of another valve apparatus according to a principle of the present disclosure.
Figure 11:
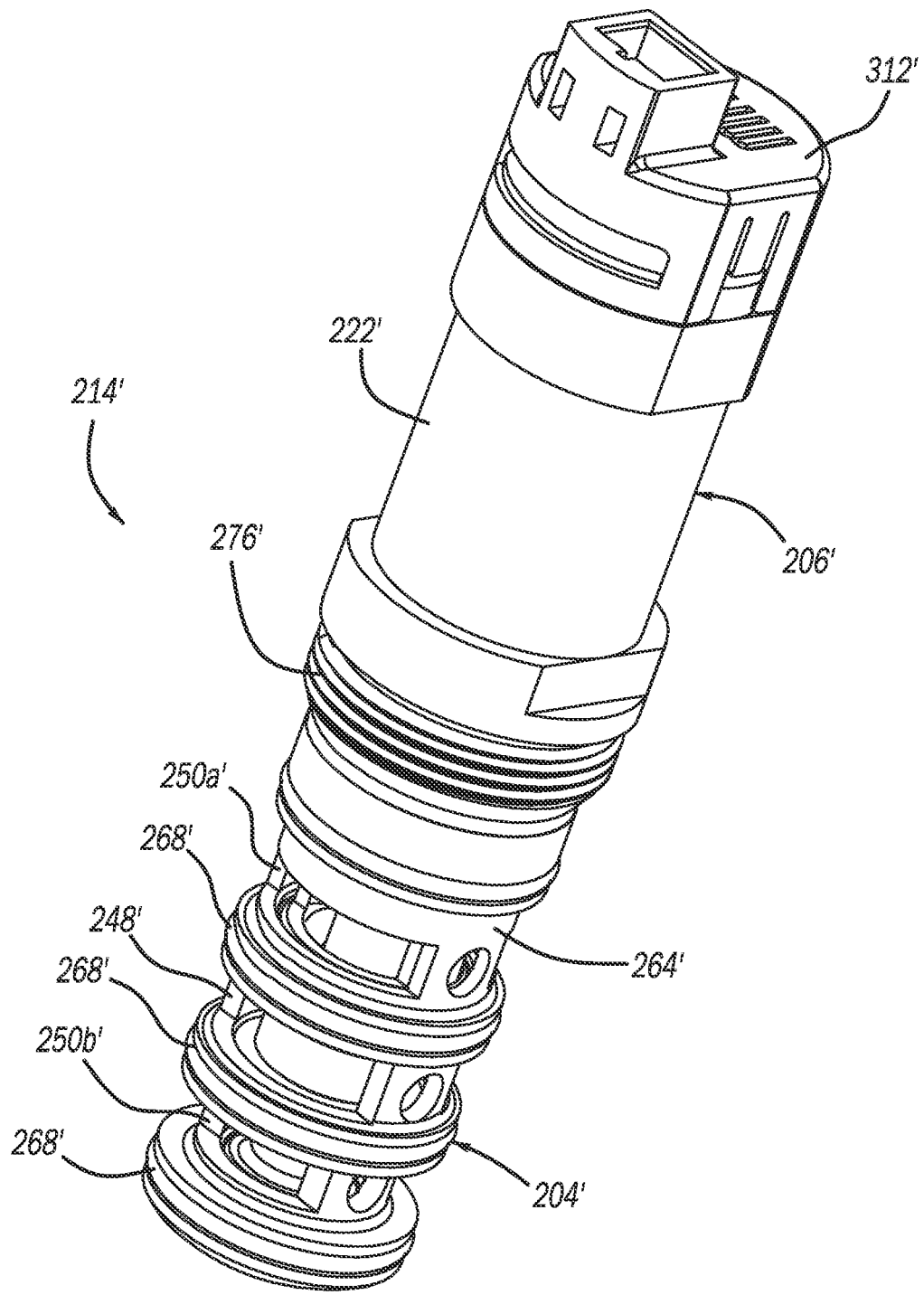
FIG. 11 is a perspective view of a valve cartridge that is part of the valve apparatus illustrated in FIG. 10.
Figure 12:
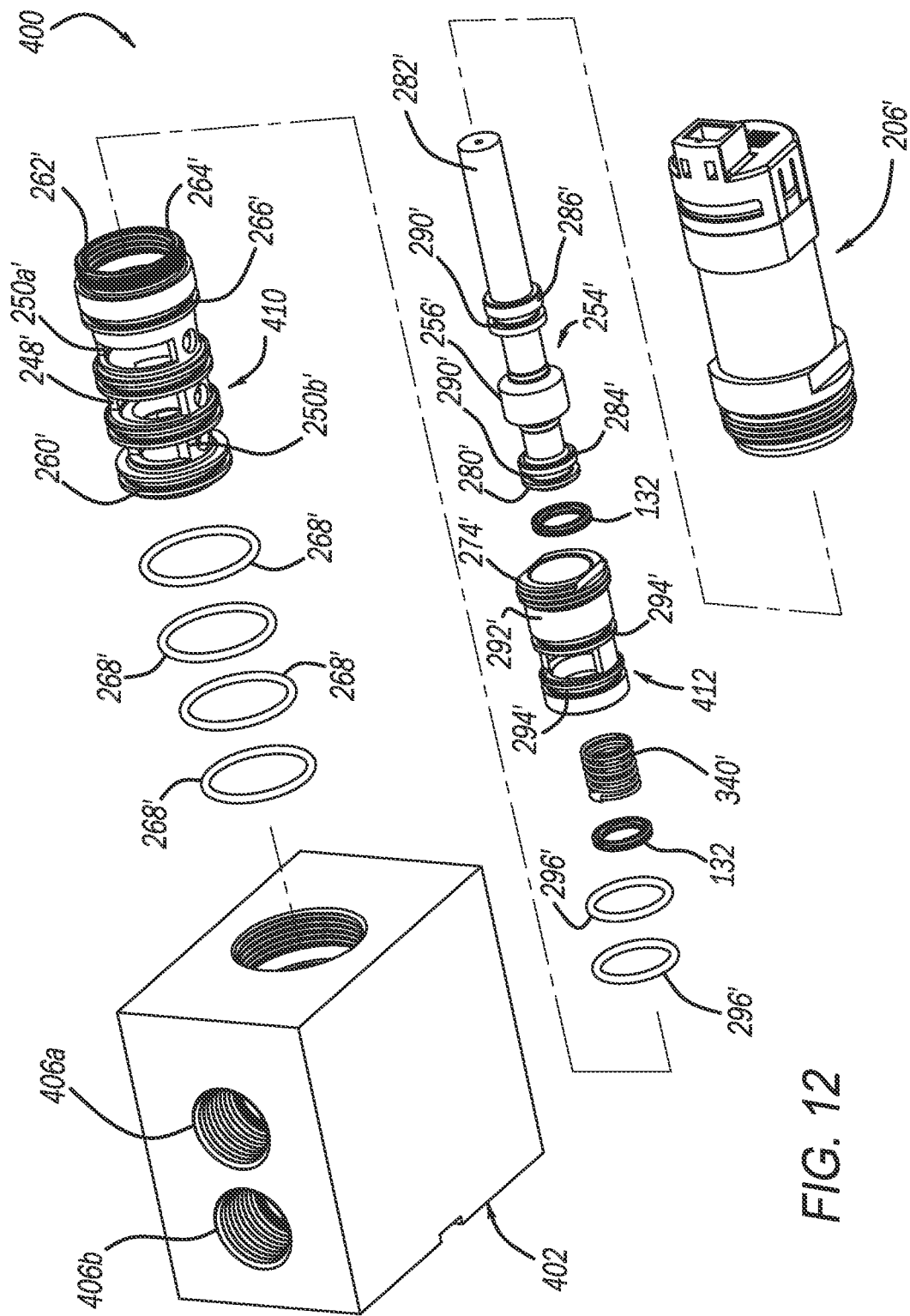
FIG. 12 is an exploded perspective view of the valve apparatus illustrated in FIG. 10.
Figure 13:
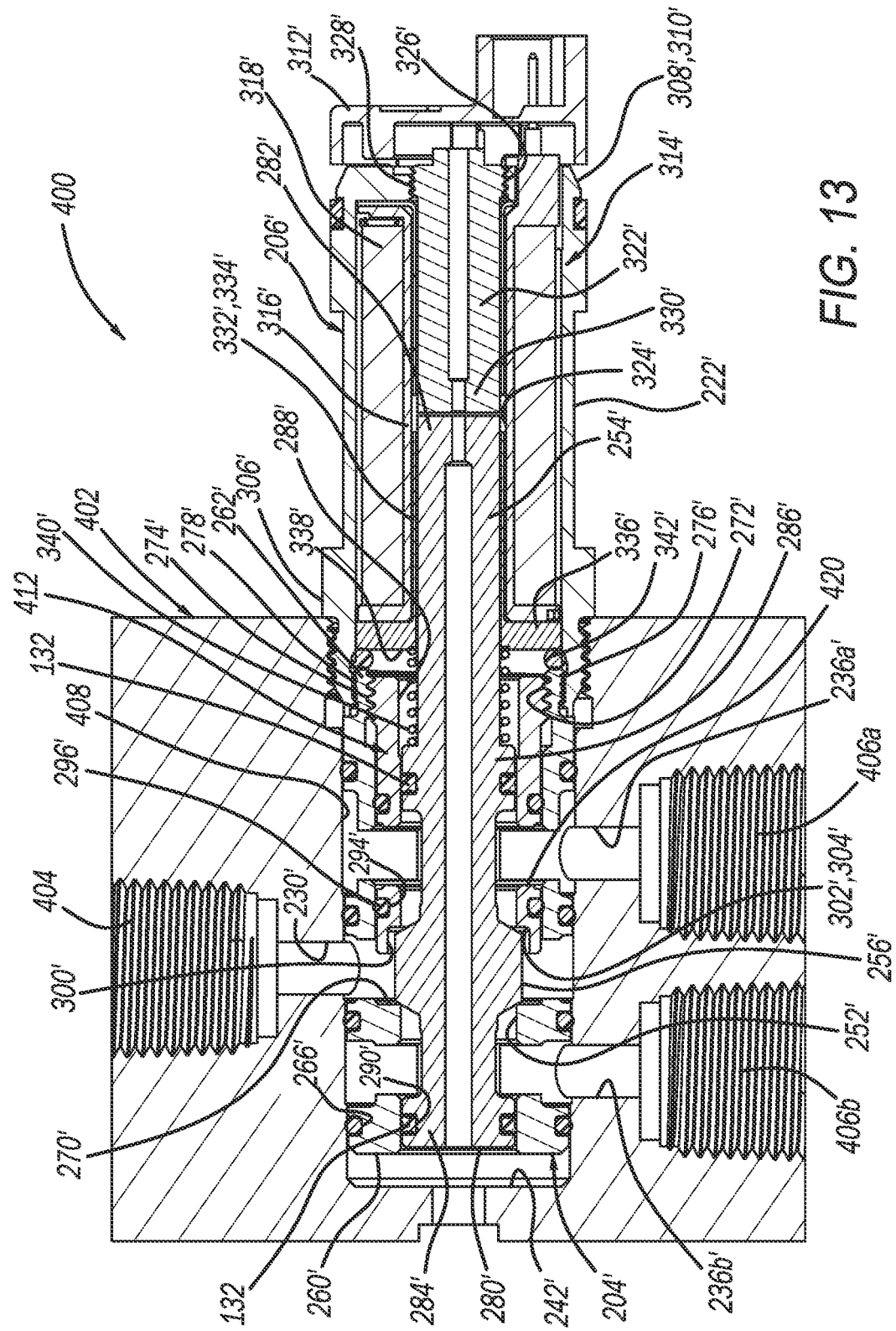
FIG. 13 is a cross-sectional view of the valve apparatus illustrated in FIG. 10.

Manifold 202 is a block-shaped member having an inlet 208 and outlet 210. It should be understood, however, that outlet 210 may serve as the inlet and the inlet 208 may serve as the outlet, if desired. In any event, manifold 202 may be formed of a rigid material such as a metal or polymeric material. Manifold 202 also defines a bore 212 that, as best shown in FIG. 9, is arranged transverse relative to each of inlet 208 and outlet 210. Bore 212 is configured for receipt of at least a portion of a cartridge 214 that is comprised of the combination of valve assembly 204 and actuator assembly 206, and is particularly configured for receipt of valve assembly 204.

Bore 212 defines an opening 216 formed in manifold 202 and includes a threaded cylindrical surface 218 that is configured to mate with a correspondingly threaded surface 220 of a housing 222 of actuator assembly 206 such that cartridge 214 can be secured to manifold 202. Bore 212 includes a first cylindrical surface 224 positioned axially inward from threaded cylindrical surface 218 that terminates at a first radially inwardly extending shoulder 226. A second cylindrical surface 228 extends axially inwardly from radially inwardly extending shoulder 226, and includes a first cylindrical opening 230 that communicates with inlet 208 before terminating at a second radially inwardly extending shoulder 232. A third cylindrical surface 234 extends axially inwardly from second radially inwardly extending shoulder 232, and includes a second cylindrical opening 236 that communicates with outlet 210 before terminating at a third radially inwardly extending shoulder 238. A fourth cylindrical surface 240 extends axially inward from third radially inwardly extending shoulder 238 before terminating at an end face 242 of bore 212. While not required, end face 242 may include an axially extending passage 244 that leads to the exterior atmosphere.

Valve assembly 204 is positioned within bore 212 such that valve assembly 204 may control fluid flow between inlet 208 and outlet 210. Valve assembly 204 includes a valve retainer 246 including a valve retainer inlet port 248 aligned with first cylindrical opening 230 and inlet 208, a valve retainer outlet port 250 aligned with second cylindrical opening 236 and outlet 210, an axially extending passage 252 configured for receipt of a poppet 254 defining a valve member 256, and an adjustable valve seat 258 positioned within axially extending passage 252 that surrounds a portion of poppet 254.

Valve retainer 246 includes a first end 260 located proximate end face 242 and an opposite second end 262 that is configured to mate with each of adjustable valve seat 258 and housing 222 of actuator assembly 206. Valve retainer inlet port 248 and valve retainer outlet port 250 are located between first end 260 and opposite second end 262, and are longitudinally (i.e., axially) spaced apart from each other. An exterior surface 264 of valve retainer 246 includes a plurality of radially inwardly extending slots 266 that are each configured for receipt of annular seal members 268 (e.g., O-rings) that sealingly engage with bore 212. Additionally, valve retainer 246 includes a first valve seat 270 that is configured to be abutted by valve member 256 when valve assembly 204 is in the closed position (illustrated).

Opposite second end 262 includes an interior thread 272 configured to mate with an exterior thread 274 of adjustable valve seat 258 such that a position of adjustable valve seat 258 can be adjusted relative to valve retainer 246. Opposite second end 262 also includes an outer threaded surface 276 that is configured to mate with an inner threaded surface 278 of housing 222 of actuator assembly 206 such that valve assembly 204 can be mated with actuator assembly 206 to collectively form cartridge 214.

Poppet 254 is an elongated member that may be formed of a rigid material such as a metal material, and includes a valve assembly end 280 and an actuator assembly end 282 where valve assembly end 280 is received within valve retainer 246 of valve assembly 204 and actuator assembly end 282 is received within housing 222 of actuator assembly 206. Valve assembly end 280 includes a first piston 284 received within first end 260 of valve retainer 246, a second piston 286 received within opposite second end 262 of valve retainer 246, and valve member 256 positioned between first piston 284 and second piston 286. First piston 284 is configured to slide along axially extending passage 252 while second piston 286 is configured to slide along an inner surface 288 of adjustable valve seat 258. First and second pistons 284 and 286 include a radially inwardly extending groove 290 that are each configured for receipt of a quad-ring sealing member 132 that is substantially similar to the quad-ring sealing member 132 described above relative to the first embodiment shown in FIGS. 1-5. Inasmuch as quad-ring sealing members 132 are substantially the same as that described previously, further description of quad-ring sealing members 132 and the benefits afforded thereby will be omitted here.

Adjustable valve seat 258 is a hollow cylindrical member having an exterior surface 292 that includes exterior thread 274 and a groove 294 configured for receipt of an annular seal 296, and inner surface 288 configured a bearing surface for second piston 286. Adjustable valve member 258 includes a cylindrical recess 300 a bottom 302 of which defines a second valve seat 304 that is spaced apart from first valve seat 270 of valve retainer 246, and that may be abutted by valve member 256 when valve assembly 204 is in the open position to permit fluid to flow from inlet 208 past valve member 256 to outlet 210.

Actuator assembly 206 is connected to valve assembly 204 by mating outer threaded surface 276 of valve retainer with inner threaded surface 278 of housing 222. Housing 222 is a generally hollow cylindrical structure that includes one end 306 having inner threaded surface 278 and an opposite end 308 that defines a coupling 310 configured to be mated with an electrical connector 312 for providing a voltage or current to a solenoid 314 provided in housing 222. Solenoid 314 includes a hollow yoke 316 that supports a solenoid coil 318 having opposing ends (not shown) that are electrically connected to a pair of leads 320 of electrical connector 312.

Actuator assembly end 282 of poppet 254 may function as an armature that is magnetically attracted to a pole piece 322 provided within an elongated aperture 324 of yoke 316. Pole piece 322 is formed of a material that can be magnetized upon application of the voltage or current to solenoid coil 318. Put another way, upon application of the voltage or current to solenoid coil 318, pole piece 322 will be magnetized to attract poppet 254 thereto, which will pull valve member 256 away from first valve seat 270 to open valve apparatus 200 and permit fluid to flow from inlet 208 through valve assembly 204 to outlet 210. Pole piece 322 includes a threaded end 326 that mates with an interior threaded surface 328 of coupling 310 such that pole piece 322 is fixed during use of valve apparatus 200. An opposing end 330 of pole piece 322 is spaced apart from actuator assembly end 282 of poppet 254 such that actuator assembly end 282 will contact opposing end 330 when pole piece 322 is magnetized and pulls actuator assembly end 282 thereto to open valve assembly 204.

A hollow bushing 332 may be positioned between yoke 316 and poppet 254. Bushing includes a hollow cylindrical sleeve 334 that extends along a portion of a length of actuator assembly end 282 of poppet 254 and a radially outwardly extending flange 336 that serves as a spring seat 338 for a biasing member 340 (e.g., spring) positioned between flange 336 and second piston 286 that biases poppet 254 and valve member 256 into engagement with first valve seat 270. In addition, an annular sealing member 342 may be positioned between flange 336 and opposite second end 262 of valve retainer 246 to provide a seal between valve assembly 204 and actuator assembly 206.

Now referring to FIGS. 10 to 13, a third embodiment of the present disclosure will be described. The valve apparatus 400 illustrated in FIGS. 10 to 13 is substantially similar to the valve apparatus 200 described above. Accordingly, features that are common to valve apparatus 200 and valve apparatus 400 will have the same reference numbers, albeit the features illustrated in FIGS. 10 to 13 will have reference numbers denoted by an apostrophe to distinguish these features from the valve assembly 200 illustrated in FIGS. 6 to 9.

The primary differences between valve apparatus 200 and valve apparatus 400 is that valve apparatus 400 is a three-way valve including a manifold 402 having an inlet 404 and a pair of outlets 406a and 406b that communicate with a bore 408. In addition, valve apparatus 400 includes a modified valve retainer 410 and modified adjustable valve seat 412 to account for the valve apparatus 400 being a three-way valve. In any event, valve apparatus 400 includes a valve assembly 204' and an actuator assembly 206' that mate to collectively form a cartridge 214' that is received within a bore 408 of manifold 402.

Valve assembly 204' is positioned within bore 408 such that valve assembly 204' may control fluid flow between inlet 404 and the pair of outlets 406a and 406b. Valve retainer 410 of valve assembly 204' includes a valve retainer inlet port 248' aligned with a first cylindrical opening 230' formed in bore 408 and inlet 404, a pair of valve retainer outlet ports 250'a and 250'b aligned with second cylindrical openings 236'a, 236'b and outlets 406a, 406b, an axially extending passage 252' configured for receipt of a poppet 254' defining a valve member 256', and adjustable valve seat 412 positioned within axially extending passage 252' that surrounds a portion of poppet 254'.

Valve retainer 410 includes a first end 260' located proximate an end face 242' of bore 408 and an opposite second end 262' that is configured to mate with each of adjustable valve seat 412 and housing 222' of actuator assembly 206'. Valve retainer inlet port 248' and valve retainer outlet ports 250'a, 250'b are located between first end 260' and opposite second end 262', and are longitudinally (i.e., axially) spaced apart from each other. An exterior surface 264' of valve retainer 410 includes a plurality of radially inwardly extending slots 266' that are each configured for receipt of annular seal members 268' (e.g., O-rings) that sealingly engage with bore 408. Valve retainer 410 additionally includes a first valve seat 270' that is configured to be abutted by valve member 256' when valve assembly 204' is in the closed position (illustrated).

Opposite second end 262' includes an interior thread 272' configured to mate with an exterior thread 274' of adjustable valve seat 412 such that a position of adjustable valve seat 412 can be adjusted relative to valve retainer 410. Opposite second end 262' also includes an outer threaded surface 276' that is configured to mate with an inner threaded surface 278' of housing 222' of actuator assembly 206' such that valve assembly 204' can be mated with actuator assembly 206' to collectively form cartridge 214'.

Poppet 254' is an elongated member that may be formed of a rigid material such as a metal material, and includes a valve assembly end 280' and an actuator assembly end 282' where valve assembly end 280' is received within valve retainer 410 of valve assembly 204' and actuator assembly end 282' is received within housing 222' of actuator assembly 206'. Valve assembly end 280' includes a first piston 284' received within first end 260' of valve retainer 410, a second piston 286' received within opposite second end 262' of valve retainer 412, and valve member 256' is positioned between first piston 284' and second piston 286'. First piston 284' is configured to slide along axially extending passage 252' while second piston 286' is configured to slide along an inner surface 288' of adjustable valve seat 412. First and second pistons 284' and 286' include a radially inwardly extending groove 290' that are each configured for receipt of a quad-ring sealing member 132 that is substantially similar to the quad-ring sealing member 132 described above relative to the first embodiment shown in FIGS. 1-4. Inasmuch as quad-ring sealing members 132 are substantially the same as that described previously, further description of quad-ring sealing members 132 and the benefits afforded thereby will be omitted here.

Adjustable valve seat 412 is a hollow cylindrical member having an exterior surface 292' that includes exterior thread 274' and grooves 294' configured for receipt of annular seals 296', and inner surface 288' configured a bearing surface for second piston 286'. Adjustable valve seat 412 includes a cylindrical recess 300' a bottom 302' of which defines a second valve seat 304' that is spaced apart from first valve seat 270' of valve retainer 410, and that may be abutted by valve member 256' when valve assembly 204' is in the open position to permit fluid to flow from inlet 404 past valve member 256' to outlet 406b. When valve assembly 204' is in the illustrated closed state, fluid is able to continuously flow from inlet 404 to outlet 406a through an outlet passage 420 that communicates with cylindrical opening 236'a formed in manifold 402.

Actuator assembly 206' is connected to valve assembly 204' by mating outer threaded surface 276' of valve retainer 410 with inner threaded surface 278' of housing 222'. Housing 222' is a generally hollow cylindrical structure that includes one end 306' having inner threaded surface 278' and an opposite end 308' that defines a coupling 310' configured to be mated with an electrical connector 312' for providing a voltage or current to a solenoid 314' provided in housing 222'. Solenoid 314' includes a hollow yoke 316' that supports a solenoid coil 318' having opposing ends (not shown) that are electrically connected to a pair of leads (not shown) of electrical connector 312'.

Actuator assembly end 282' of poppet 254' may function as an armature that is magnetically attracted to a pole piece 322' provided within an elongated aperture 324' of yoke 316'. Pole piece 322' is formed of a material that can be magnetized upon application of the voltage or current to solenoid coil 318'. Put another way, upon application of the voltage or current to solenoid coil 318', pole piece 322' will be magnetized to attract poppet 254' thereto, which will pull valve member 256' away from first valve seat 270' to open valve apparatus 400 and permit fluid to flow from inlet 404 through valve assembly 204' to outlet 406b rather than outlet 406a. Pole piece 322' includes a threaded end 326' that mates with an interior threaded surface 328' of coupling 310' such that pole piece 322' is fixed during use of valve apparatus 400. An opposing end 330' of pole piece 322' is spaced apart from actuator assembly end 282' of poppet 254' such that actuator assembly end 282' will contact opposing end 330' when pole piece 322' is magnetized and pulls actuator assembly end 282' thereto to open valve apparatus 400.

A hollow bushing 332' may be positioned between yoke 316' and poppet 254'. Bushing 332' includes a hollow cylindrical sleeve 334' that extends along a portion of a length of actuator assembly end 282' of poppet 254' and a radially outwardly extending flange 336' that serves as a spring seat 338' for a biasing member 340' (e.g., spring) positioned between flange 336' and second piston 286' that biases poppet 254' and valve member 256' into engagement with first valve seat 270'. In addition, an annular sealing member 342' may be positioned between flange 336' and opposite second end 262' of valve retainer 410' to provide a seal between valve assembly 204' and actuator assembly 206'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve apparatus, comprising:

a manifold having a bore, an inlet communicating with the bore, and an outlet communicating with and axially aligned with the bore;

a valve cartridge at least partially received within the bore and including a valve assembly having a valve member that enables communication between the inlet and the outlet, and an actuator assembly for actuating the valve member;

the valve assembly including a hollow valve retainer having a first end that is configured to mate with the actuator assembly and an opposite second end received within the bore and defining an outlet port that communicates with the outlet of the manifold, the hollow valve retainer including a first plate-shaped member and a second plate-shaped member connected by a pair of axially extending arms that separate the first and second plate-shaped members by a gap that serves as an inlet port of the valve retainer in communication with the inlet of the manifold, the first plate-shaped member including a first axially-extending through-hole that defines the outlet port and the second plate-shaped member including a second axially-extending through-hole that is configured for receipt of a poppet having the valve member therein, the first plate-shaped member includes a first face that faces the gap and an opposite second face that faces the outlet of the manifold, the first axially-extending through-hole extends between the first face and the second face, and the first axially-extending through hole includes a first chamfered surface that defines a valve seat at the first face that is configured to be contacted by the valve member when the valve apparatus is in a closed position and spaced apart from the valve member when the valve apparatus is in an open position;

the poppet includes a proximate end positioned within the actuator assembly and a distal end that includes the valve member, the distal end having a radially inwardly extending groove between the valve member and the proximate end that is configured for receipt of an annular quad-ring sealing member that seals an interface between the poppet and the second axially-extending through hole of the valve retainer as the poppet and valve member are moved during operation of the valve apparatus by the actuator assembly; and the valve member at the distal end of the poppet includes a second chamfered surface that corresponds to the first chamfered surface that defines the valve seat.

2. The valve apparatus according to claim 1, further comprising a biasing member that biases the poppet and valve member to the closed position, the biasing member being in contact with an annular arm that extends radially outward from the poppet.

3. The valve apparatus according to claim 2, wherein the radially inwardly extending groove having the annular quad-ring sealing member is positioned between the valve member and the annular arm that extends radially outward from the poppet.

4. The valve apparatus according to claim 1, wherein the first axially-extending hole includes the first chamfered surface and a cylindrical surface connected to the first chamfered surface.

5. The valve apparatus according to claim 4, wherein the first chamfered surface includes a first end connected to the first face of the first plate-shaped member and a second end that defines an apex, and a radially outwardly extending surface connects the apex to the cylindrical surface, and wherein the radially outwardly extending surface that connects the apex to the cylindrical surface defines a seat configured for receipt of an annular seal member that is configured to be contacted by valve member when the valve apparatus is in the closed position.

6. The valve apparatus according to claim 1, wherein the second plate-shaped member of the hollow valve retainer includes a first face that faces the gap and an opposite second face that faces the actuator assembly;

a hollow cylindrical protrusion extends axially outward from the second face and includes a terminal end that defines the first end of the hollow valve retainer that is configured to mate with the actuator assembly, an outer surface of the terminal end being threaded to threadingly mate with a threaded surface of a housing of the actuator assembly.

7. The valve apparatus according to claim 6, wherein the housing of the actuator assembly is configured for receipt of the proximate end of the poppet.

8. The valve apparatus according to claim 7, wherein the actuator assembly includes the housing, and a solenoid configured to magnetize a pole piece positioned in the housing to magnetically attract the proximate end of the poppet to move the valve member away from the valve seat and open the valve apparatus.

* * * * *